Jan. 27, 1959   F. W. GAGE ET AL   2,870,672
TRAVELLING MATTE PHOTOGRAPHY
Filed May 28, 1956

INVENTORS.

United States Patent Office 2,870,672
Patented Jan. 27, 1959

2,870,672

TRAVELLING MATTE PHOTOGRAPHY

Fred W. Gage, Los Angeles, and Albert W. Tondreau, Arcadia, Calif., assignors to Warner Bros. Pictures, Inc., Burbank, Calif., a corporation of Delaware Application May 28, 1956, Serial No. 587,627

2 Claims. (Cl. 88—16)

This invention relates to motion picture production and particularly to the portion of motion picture production commonly known as the "travelling matte process."

In our Patent No. 2,651,233, of September 8, 1953, there is disclosed and claimed a travelling matte process which simultaneously produces a negative foreground film component with a transparent background, and a negative transparent film matte, or silhouette, of the foreground with an opaque background. The positive prints of these negatives reverse the densities of the latter. With the more prevalent use of color motion pictures, the desire for high quality in the final product has grown, and this invention is directed to a high quality travelling matte process while providing the necessary speed required for fast action and depth of focus.

An important feature of the travelling matte technique of the present invention, in addition to the high quality and speed obtained, is its economy. It requires a smaller stage space than prior processes and eliminates the transportation of an entire company of actors to the scene of the background which may involve long and expensive trips. It requires fewer electricians and less power. The final composite picture has a high quality since both the background and foreground components are in better and sharper focus which increases the over-all picture detail.

Some of the prior travelling matte processes, when adapted to color photography, are unable to reproduce translucent materials, such as smoke, a glass of water, or fine mesh veils. Furthermore, certain presently used proceses are difficult because the colors in the foreground corresponding to the background color will eventually appear in the same manner as the background so that holes are produced in the foreground picture. They also require many printing steps which affect definition deleteriously.

With the advent of large screens, which may be curved and which may have an aspect ratio as high as 2.55 to 1, large background screens for composite photography are employed. To use such large background screens, the usual projection type of rear screen lighting, as described in our above-mentioned patent, requires a large space behind the screen to uniformly and sufficiently illuminate the entire screen. However, the present invention is directed to an improvement over our patented process, since it permits a lower intensity of background screen lighting, the obtaining of a more uniform background illumination, and a light source which requires less space than prior light sources and one which is considerably more economical to operate. There is no noise or smoke produced, as well as substantially no heat generated. The structure of this light source unit is disclosed and claimed in co-pending application, Ser. No. 600,420, filed July 27, 1956, and assigned to the same assignee.

The use of such an advantageous background lighting unit and the elimination of a background light filter for the matte film, permits an over-all system which has all the advantages of our prior system together with additional advantages as will be recognized from the following detailed description of the invention.

Another feature of our invention is the provision of a visible image of the background component to be subsequently combined with the foreground component in the final composite, on the background screen during the photographing of the foreground component, so that the director may correlate and synchronize the action of the foreground component with the background component. The background component image is provided without interefering with either the foreground or with the photographing of the matte.

The principal object of the invention, therefore, is to facilitate the production of travelling matte motion picture sequences.

Another object of the invention is to provide an improved method of simultaneously photographing a foreground component and a matte therefor.

A further object of the invention is to provide an improved system for obtaining a travelling matte in motion picture color photography.

A still further object of the invention is to obtain an image of the background component in its proper relationship with the foreground component during the production of a travelling matte and the photographing of the foreground component.

The novel features which are believed to be characteristic of this invention, both as to the manner of its organization and the mode of its operation, will be better understood from the following description when read in conjunction with the accompanying drawings, in which.

Figure 1:
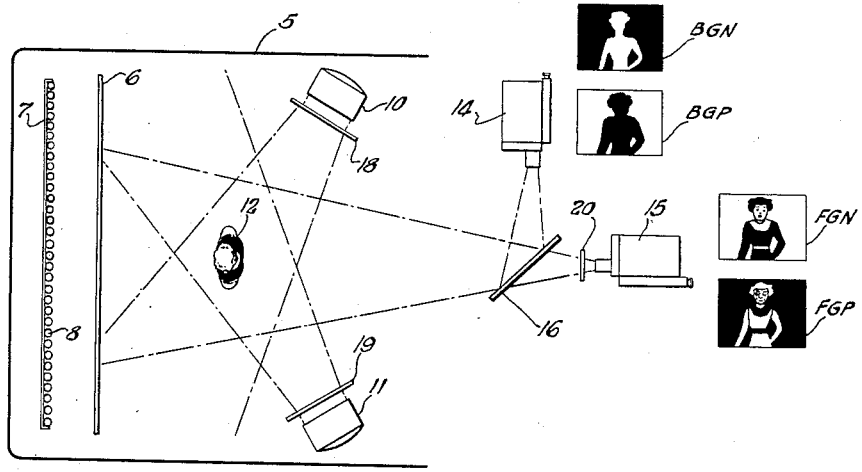
Fig. 1 is a diagrammatic view of a photographing system embodying the invention.

Referring now to the drawings, and particularly to Fig. 1, a portion of the usable floor space on a stage is indicated by the outline 5, while a translucent screen 6 is of the type now in general use for composite photography where the background component is projected on the rear of the screen during the photographing of the foreground component in front of the screen. Although the screen is shown in a flat plane, it may also be curved. Because of the type of photographing and projection methods and systems now being used, wherein either large films such as 55 mm. and 65 mm. are used, or where the images are squeezed horizontally on standard 35 mm. film and then expanded during projection, the translucent screen is generally large in size. When such a large screen is necessary, a large space is required behind the screen to obtain the proper collimation of the light from the projecting type of light sources, such as arc lamps, as shown in our above-mentioned patent, and even under these circumstances, the desired uniformity of illumination of the screen is not always obtainable.

The present invention utilizes a light source composed of a plurality of ultra-violet fluorescent tubes positioned side by side in substantially the same plane on a frame substantially the size of the translucent screen. When smaller screens are used, the edge portions of the light source may be covered. The light source may also be curved if the screen is curved so that the same distance separates the screens. Such a light source unit is shown diagrammatically at 7, and it is to be noted that it occupies a small amount of space and is closely adjacent the translucent screen 6, the light source and screen being movable with respect to each other to increase and decrease the intensity of the ultra-violet light on the screen. By uniform distribution of the ultra-violet fluorescent tubes 8, a very uniform lighting of the screen 6 is obtainable without the large space required behind the screen for incandescent or arc lights which give off considerable heat, noise, and smoke. Also, only one operator is required for the entire bank unit of fluorescent tubes rather than an operator for each of the many projection lamps normally required.

Figure 2:
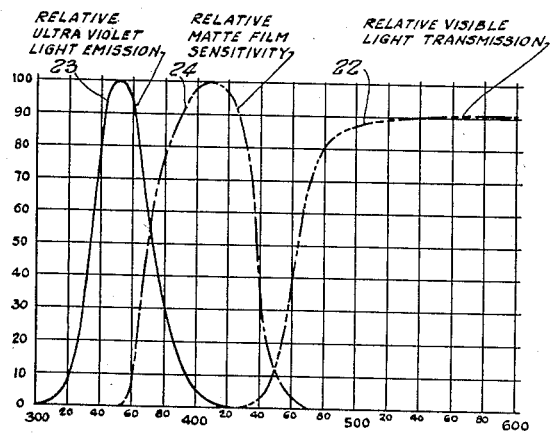
Fig. 2 is a graph showing the cut-off characteristics of the filters and the sensitivity characteristic of the film used in the invention.

The other elements of the system shown in Fig. 1 include light sources 10 and 11 for the foreground component of the composite picture indicated at 12, and two cameras 14 and 15 with a beam splitter 16, which may be either a partially silvered transmitter-reflector unit or a prism. As mentioned above, and in our patent, the foreground action 12 is illuminated with visible light, the spectrum of which is controlled by filters 18 and 19, while a filter 20 is provided for the foreground camera 15. In our patented process, separate filters were used in front of the arc lamps illuminating the background screens. In the present light source, the ultra-violet fluorescent tubes 8 have their own filters embodied therein. The tube filters pass ultra-violet light as shown by the curve 23 in Fig. 2. A filter to pass this background screen light, but not visible light, was formerly used in front of camera 14.

The camera 15 records the photographic details of the foreground, as shown by the negative "FGN" and the positive "FGP." The negative has a detailed foreground component since the visible light from the sources 10 and 11 will pass through the filter 20 and register the definition of the foreground on the negative "FGN." However, the filter 20 will eliminate any effective ultra-violet light from the source 7 so that no light to which the film in camera 15 is sensitive will reach the area of this film around the foreground image, and thus this area is transparent in the negative and opaque in the positive. The filters 18, 19, and 20 pass substantially the same light frequencies which are from substantially 440 millimicrons up through the visible spectrum as shown by curve 22 in Fig. 2.

With respect to camera 14, this camera produces a transparent silhouette of the foreground since the negative film therein is not sensitive to the visible light on the foreground and produces an area around the silhouette which is opaque because the negative film is sensitive to the ultra-violet light. This is accomplished by utilizing a negative film in camera 14 which has an approximate light sensitive range as shown by the curve 24 in Fig. 2. The range of important sensitivity of this film is from approximately 360 millimicrons to approximately 460 millimicrons. This permits the elimination of a filter in front of camera 14 and simplifies the optics of both cameras. The elimination of the filter also permits a lesser intensity of ultra-violet light to produce the same opacity in the negative shown at "BGN" and thus a greater transparency for the area surrounding the silhouette in the positive shown at "BGP." This increases the speed of the system to produce mattes of explosions and permits a greater depth of focus to be obtained.

By the use of filters 18, 19, and 20 having a light transmission characteristic substantially as shown by curve 22, no visible light having a wavelength below approximately 440 millimicrons will be impressed on the foreground and on the film in camera 15, and the area around the detailed foreground will thus be transparent. Furthermore, since the film in camera 14 is very insensitive to any visible light having a wavelength above approximately 450 millimicrons, there will be no deleterious contamination of the foreground silhouette in "BGN" or "BGP" by any visible light on the foreground. The foreground lighting may thus reach screen 6 without affecting the matte film. The filters used at 18 and 19 may be a combination of Corning filters 3–73 or 3–74, together with two Brigham gelatine filters No. Y–1. By adding a Brigham No. 52, a better safety factor is obtained. The filter 20 may be a Wratten No. 3. With a matte film of a different characteristic, the filters may be varied accordingly, the above values now being preferred.

Thus, the above system will permit a very uniform light source behind the translucent screen of comparatively low intensity while providing proper density of the travelling matte and non-contamination of either the silhouette or the background area of the foreground picture. By eliminating a filter in front of camera 14 which provides the matte film, an exposure increase of at least 1¾ stops is obtained which is particularly important for high speed work, such as explosions and similar types of shots.

Figure 3:
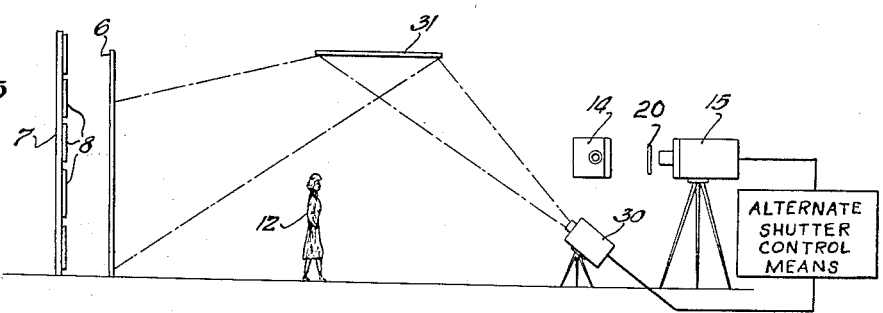
Fig. 3 is a diagrammatic view showing the projection of the background component image.

By the use of the above combination of filters and matte film, a background image in visible light may be projected on the screen to aid the director in cueing his foreground action. To accomplish this, a projector 30 (see Fig. 3), may project an image of the background to an elevated mirror 31 so that the light is projected over the foreground onto screen 6. The projector itself may also be elevated above the foreground which will eliminate the mirror 31, or the image may be projected from the side with the projector rotated 90 degrees. Any keystone effect is not harmful since the background component image is only used for cueing. To eliminate any possibility of any visible light having a wavelength below 440 from the projected image from reaching the film in camera 14, a filter having a characteristic similar to filters 18, 19, and 20 may be placed in front of projector 30. Also, for safety, when a filter in front of projector 30 is not used, the shutter of the projector is synchronized with the shutters in cameras 14 and 15, so that the projector shutter is closed when the camera shutters are open.

We claim:

1. A composite photographing process for simultaneously obtaining a defined negative image of a foreground component surrounded by a transparent area and a negative transparent silhouette of said foreground component surrounded by an opaque area, said transparent and opaque areas to be subsequently provided with a background component, which comprises positioning a foreground component in front of a translucent screen, positioning illuminating means having a surface substantially equal to the surface of said screen closely adjacent the back of said screen, said means uniformly illuminating said screen with ultra-violet light, positioning a light source in front of said screen and illuminating said foreground component with light from said source through a filter which transmits visible light rays whereby the foreground component is illuminated with visible light, providing two light sensitive photographic emulsions, focusing said foreground component on said emulsions, one of said photographic emulsions having substantially no sensitivity to said visible light rays and said other photographic emulsion having a sensitivity to said visible light rays, providing a light filter in front of the other of said emulsions having a sensitivity to said visible light rays, said filter transmitting said visible light rays to which said first-mentioned emulsion is not sensitive, providing a light beam splitter to divide the light from said screen and said foreground component reaching said emulsions whereby when said light sensitive emulsions are developed, the positive printed from the developed emulsion behind said last-mentioned filter which transmits only said visible light rays will have a defined positive image of said foreground component and the area surrounding said foreground component will be opaque, and whereby the positive printed from the developed emulsion not having any substantial sensitivity to visible light rays will have an opaque silhouette of said foreground component and the area surrounding said silhouette will have substantially no density, the latter positive providing a matte of said foreground component, projecting an image of the background component to be subsequently combined with said foreground component on said screen during the photographing of and while avoiding said foreground component, the light forming said background component being projected on said screen alternately with the exposure of said foreground component.

2. A system for simultaneously photographing a defined negative image of a foreground component surrounded by a transparent area and a negative transparent silhouette of said foreground component surrounded by an opaque area, said areas to be subsequently provided with a background component which comprises a vertically arranged translucent screen, an ultra-violet light source in a plane and of substantially the size of said screen, said light source being in a plane substantially parallel with the plane of said translucent screen, a light source for illuminating said foreground component in front of said translucent screen, said light source projecting visible light rays on said foreground component, a pair of light sensitive photographic emulsions, means for focusing said foreground component and the same area of said translucent screen on each of said emulsions, one of said emulsions having substantially no sensitivity to visible light rays, means positioned in front of the other of said emulsions for transmitting only visible rays thereto, said other emulsion being sensitive to said visible light rays, the positive printed from said last mentioned emulsion providing a defined positive image of said foreground component surrounded by an opaque background area, and the positive image printed from said first-mentioned emulsion providing an opaque silhouette of said foreground component surrounded by a transparent background area, and means for projecting a background component on said screen during the photographing of and while avoiding said foreground component, said last-mentioned means including means for projecting said background component on said screen alternately with the exposure of said foreground component.

References Cited in the file of this patent

UNITED STATES PATENTS

| | | |
|---|---|---|
| 1,982,211 | Gillette | Nov. 27, 1934 |
| 2,028,975 | Gillette | Jan. 28, 1936 |
| 2,553,903 | Dufour | May 22, 1951 |
| 2,651,233 | Tondreau et al. | Sept. 8, 1953 |

FOREIGN PATENTS

| | | |
|---|---|---|
| 397,969 | Great Britain | Sept. 7, 1933 |
| 502,890 | Great Britain | June 23, 1937 |